United States Patent
Thomas et al.

(10) Patent No.: US 7,294,089 B2
(45) Date of Patent: Nov. 13, 2007

(54) MULTIPLE-SPEED AUTOMATIC TRANSMISSION

(75) Inventors: Steve G. Thomas, Bloomfield Hills, MI (US); Gregory D. Goleski, Warren, MI (US); Donald E. Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 11/203,693

(22) Filed: Aug. 15, 2005

(65) Prior Publication Data
US 2007/0037657 A1   Feb. 15, 2007

(51) Int. Cl.
   *F16H 3/44* (2006.01)
(52) U.S. Cl. ........................ 475/296; 475/271
(58) Field of Classification Search ............. 475/284, 475/288, 275, 196, 271, 296
   See application file for complete search history.

(56) References Cited

U.S. PATENT DOCUMENTS

| 5,106,352 | A |   | 4/1992  | Lepelletier |
| 5,176,592 | A | * | 1/1993  | Nakawaki et al. ........... 475/278 |
| 6,135,912 | A | * | 10/2000 | Tsukamoto et al. ......... 475/271 |
| 6,558,287 | B2 |  | 5/2003  | Hayabuchi et al. |
| 6,811,513 | B1 |  | 11/2004 | Filanovsky et al. |
| 6,827,664 | B2 |  | 12/2004 | Stevenson et al. |
| 6,887,178 | B2 |  | 5/2005  | Miyazaki et al. |
| 7,008,347 | B2 | * | 3/2006  | Klemen ........................ 475/296 |
| 7,029,416 | B2 |  | 4/2006  | Miyazaki et al. |
| 2005/0247153 | A1 | * | 11/2005 | Nozaki et al. ............ 74/473.11 |
| 2006/0030446 | A1 | * | 2/2006  | Nozaki et al. ............... 475/119 |
| 2006/0264297 | A1 | * | 11/2006 | Seki et al. ................... 475/324 |
| 2006/0270513 | A1 | * | 11/2006 | Klemen ........................ 475/275 |

* cited by examiner

*Primary Examiner*—Charles A. Marmor
*Assistant Examiner*—Justin K. Holmes
(74) *Attorney, Agent, or Firm*—David B. Kelley; MacMillan Sobanski & Todd, LLC

(57) ABSTRACT

An automatic transmission includes a first power path producing a first ratio of a speed of the input and a speed of a first power path output; a second power path producing a second ratio of a speed of the input and a speed of the second power path output, the second ratio being is less than the first ratio; a double planetary gear unit including first, second, third and fourth members, the second member being secured to the output; a first clutch being operable to connect the first member to the input through the first power path; a second clutch being operable to connect the fourth member to the input through the first power path; a third clutch being operable to connect the third member carrier to the input through the second power path; a fourth clutch being operable to connect the fourth member to the input through the second power path; a first brake being operable to hold the fourth member against rotation; and a second brake being operable to hold the third member against rotation.

15 Claims, 4 Drawing Sheets

CONTROL ELEMENT SCHEDULE

| | CLT_A 64 | CLT_B 66 | BRK_C 72 | BRK_D 74 | CLT_E 68 | CLT 70 | RATIO |
|---|---|---|---|---|---|---|---|
| 1st | X | | | X | | | 6.384 |
| 2nd | X | | X | | | | 3.498 |
| 3rd | X | X | | | | | 2.250 |
| 4th | X | | | | | X | 1.556 |
| 5th | X | | | | X | | 1.243 |
| 6th | | | | | X | X | 1.000 |
| 7th | | X | | | X | | 0.807 |
| 8th | | X | X | | | | 0.698 |
| Rev 1 | | X | | X | | | -5.211 |
| Rev 2 | | | | X | | X | -2.316 |

Figure 2

CONTROL ELEMENT SCHEDULE

| | CLT_A 64 | CLT_B 66 | BRK_C 72 | BRK_D 74 | CLT_E 68 | CLT 70 | RATIO |
|---|---|---|---|---|---|---|---|
| 1st | X | | | X | | | 6.169 |
| 2nd | X | | X | | | | 3.461 |
| 3rd | X | X | | | | | 2.250 |
| 4th | X | | | | | X | 1.565 |
| 5th | | | | | X | | 1.254 |
| 6th | | | | | X | X | 1.000 |
| 7th | | X | | | X | | 0.801 |
| 8th | | X | X | | | | 0.691 |
| Rev 1 | | X | | X | | | -5.033 |
| Rev 2 | | | | X | | X | -2.237 |

*Figure 4*

MULTIPLE-SPEED AUTOMATIC TRANSMISSION

BACKGROUND OF THE INVENTION

This invention relates to the field of automatic transmissions for motor vehicles. More particularly, the invention pertains to a kinematic arrangement of gearing, clutches, brakes, and the interconnections among them in such transmissions.

U.S. Pat. No. 5,106,352 describes a multi-speed automatic transmission for motor vehicles that includes two parallel gearsets providing two fixed speed ratios. The second speed ratio is higher than the first speed ratio. A first power path using the first fixed speed ratio includes a first control clutch and a second control clutch, and a second power path using the second fixed speed ratio includes a third control clutch. Several embodiments of the transmission include a double planetary gearset; other embodiments disclose a Ravigneaux gearset, a first control brake and a second control brake. Alternatively, the input shaft and output shaft are in alignment and one of the two speed ratios is a direct drive.

Optional axle ratios are used to improve towing. performance of heavy duty trucks. Although steeper axle ratios improve vehicle launch capability when the vehicle is loaded, these axle ratios produce lower fuel economy even when the vehicle is unloaded, and multiple axle ratios add complexity to the vehicle assembly process. In North America, operators of 4×4 trucks rarely use the Low Range in today's 4×4 applications that provide two- speed transfer cases. The transfer case clutch mechanism for selecting low-range and high-range operation on many transfer cases cannot be shifted unless the vehicle is stopped.

SUMMARY OF THE INVENTION

A transmission according to the present invention is compact, includes a minimum number of friction elements, and provides well-spaced gear ratios. The transmission can produces eight forward speeds, five underdrive speed ratios, a direct ratio, two overdrive forward ratios, one high-speed ratio reverse gear, and one lower-speed ratio reverse gear, yet it requires only two braking elements and four rotating clutches.

The transmission provides two drive modes. One mode could replace the optional axle ratios and/or replace a two speed transfer case. The transmission produces a low range first gear, whose speed ratio is about 6.2, which can be used either for launching the vehicle when the vehicle is loaded, such as when hauling a trailer, or as the low range launch gear for 4×4 low range operation. In addition, an operator of a 4×4 drive system will have the ability to shift from the low range to the high range under full torque.

When the operator requires normal launch mode, the transmission would provide a second gear with a conventional first gear launch speed ratio of about 3.5. The seven speed ratios produced in second through eighth gears provide a close ratio gearbox having a span greater than 5.0.

The transmission provides excellent fuel economy in normal drive mode. A selector switch for 4×4 vehicles can have 4×2, 4×4 high and 4×4 low modes, but could also have added functions like 4×4 Auto, Trailer Tow, and Snow modes. These modes are achieved by starting the transmission in first, second or third gear and using a 4×4 on-demand clutch in off, stand-by or applied mode. Two reverse speeds available for these modes.

A double planetary gear unit may include a Ravigneaux gearset or a modified Simpson gearset.

A multiple speed automatic transmission according to the present invention includes a first power path producing a first ratio of a speed of the input and a speed of a first power path output; a second power path producing a second ratio of a speed of the input and a speed of the second power path output, the second ratio being is less than the first ratio; a double planetary gear unit including first, second, third and fourth members, the second member being secured to the output; a first clutch being operable to connect the first member to the input through the first power path; a second clutch being operable to connect the fourth member to the input through the first power path; a third clutch being operable to connect the third member carrier to the input through the second power path; a fourth clutch being operable to connect the fourth member to the input through the second power path; a first brake being operable to hold the fourth member against rotation; and a second brake being operable to hold the third member against rotation.

DESCRIPTION OF THE DRAWINGS

The above, as well as other advantages of the present invention will become readily apparent to those skilled in the art from the following detailed description of a preferred embodiment when considered in the light of the accompanying drawings in which:

FIG. 2 is chart showing for each forward and reverse speed ratio the operating state of the clutches and brakes that control the transmission of FIG. 1, and a preferred speed ratio for each gear.

FIG. 4 is a chart showing for each forward and reverse speed ratio the operating state of the clutches and brakes that control the transmission of FIG. 3, and a preferred speed ratio for each gear.

DESCRIPTION OF THE PREFERRED EMBODIMENT

Figure 1:
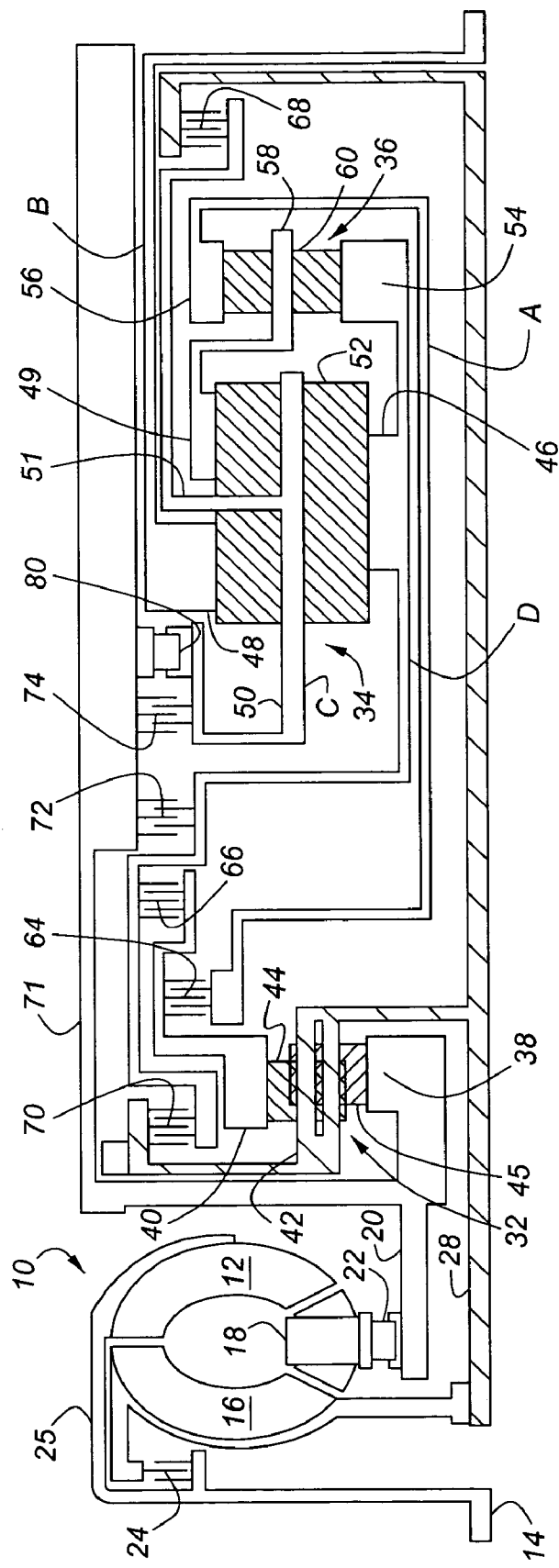
FIG. 1 is a schematic diagram illustrating the kinematic arrangement of a transmission according to the present invention that incorporates a modified Simpson gear unit.

Referring now to the drawings, there is illustrated in FIG. 1 the kinematic arrangement of an automatic transmission according to the present invention. A torque converter 10 includes an impeller wheel 12 connected to the crankshaft 14 of an internal combustion engine, a bladed turbine wheel 16, and a bladed stator wheel 18. The impeller, stator and turbine wheels define a toroidal fluid flow circuit, whereby the impeller is hydrokinetically connected to the turbine. The stator 18 is supported rotatably on a stationary stator sleeve shaft 20, and an overrunning brake 22 anchors the stator to the shaft 20 to prevent rotation of the stator in a direction opposite the direction of rotation of the impeller, although free-wheeling motion in the opposite direction is permitted.

The torque converter includes a lockup clutch 24 located within the torque converter impeller housing 25. When clutch 24 is engaged, the turbine and impeller are mechanically connected to a transmission input shaft 28; when clutch 24 is disengaged, the turbine and impeller are hydrokinetically connected and mechanically disconnected. Fluid contained in the torque converter is supplied to the torque converter from the output of an oil pump assembly (not shown) and is returned to an oil sump, to which an inlet of the pump is connected hydraulically.

A planetary gear system includes first, second, and third gear units 32, 34, and 36. The first gear unit 32, is a compound planetary gear unit, includes a sun gear 38, ring gear 40, carrier 42, and two sets of planet pinions 44, 45 supported on carrier 42 in meshing engagement with sun gear 38 and ring gear 40. Pinions 44 are in mesh with ring gear 40; pinions 45 are in mesh with sun gear 38 and pinions 44.

The second gear unit 34 includes a sun gear 46; axially spaced first and second ring gears 48, 49; carrier 50; and planetary pinions 52, rotatably supported on carrier 50 in meshing engagement with sun gear 46 and ring gears 48, 49.

A member 51, secured to carrier 50 and extending radially between the first ring gear 48 and second ring gear 49, is driveably connected to a clutch. In this way, carrier 50 is accessible to the input 28 through engagement of clutch 68, and the first ring gear 48 of the second gear unit 34 is secured to the output 29 for rotation therewith without interference.

The third gear unit 36 includes a sun gear 54, ring gear 56, carrier 58, and planetary pinions 60, rotatably supported on carrier 58 in meshing engagement with sun gear 54 and ring gear 56.

The sun gear 38 of the first gear unit 32 is fixed against rotation. The carrier 42 of the first gear unit 32 is driveably connected to the input 28. The first ring gear 48 of the second gear unit 34 is driveably connected to the output 29. The second ring gear 49 of the second gear unit 34 is driveably connected to the carrier 58 of the third gear unit 36. Carrier 42 is continually driveably connected to clutch 70. The sun gear 46 of the second gear unit 34 is secured to the sun gear 54 of the third gear unit 36.

Ring gear 40 of the first gear unit 32 is continually driveably connected to clutches 64 and 66. Clutch 64 alternately driveably connects and disconnects ring gear 40 and ring gear 56. Clutch 66 alternately driveably disconnects and connects ring gear 40 to sun gears 46 and 54, which are secured mutually to rotate as a unit.

Carrier 50 of the second gear unit 34 is continually driveably connected to clutch 68, and input 28 is continually driveably connected to clutch 68, which alternately driveably connects and disconnects carrier 50 and input 28.

Carrier 42 of the first gear unit 32 is continually driveably connected to clutch 70, and the sun gears 46, 54 are continually driveably connected to clutch 70, which alternately driveably disconnects and connects carrier 42 to sun gears 46, 54.

Sun gears 46, 54 are held against rotation preferably on a transmission case 71 upon engagement of a first friction brake 72, and those sun gears are released for free rotation upon disengagement of brake 72. Engagement of a second friction brake 74 holds carrier 50 against rotation on the transmission case 71. Disengagement of brake 74 releases carrier 50 for free, independent rotation.

Clutches 64, 66, 68, 70 and brakes 72, 74, are preferably hydraulically-actuated friction devices having sets of interleaved friction discs and spacer plates, the discs being secured to one element of the clutch or brake, the spacer plates secured to another element of the clutch or brake. When hydraulic pressure increases in the cylinder of a servo that actuates a respective friction element, the discs and plates of the respective friction element are forced by displacement of the servo piston into mutual frictional contact, thereby producing a drive connection between the components of the gear units to which the elements of the clutch or brake are secured. When the pressure is vented from the servo cylinder, the clutch or brake is disengaged and the components are free to rotate independently. U.S. Pat. No. 4,943,921 describes and illustrates examples of hydraulically actuated friction clutches and brakes, which can be used in the transmission of this invention.

A first power path, whose speed ratio is greater than unity in the embodiment illustrated in FIG. 1, driveably connects ring gear 40 of the gear unit 32, the first power path output, through clutch 64 to ring gear 56 of the third gear unit 36, and connects ring gear 40 through clutch 66 to the sun gears 46, 54. A second power path, whose speed ratio is less than the first fixed speed ratio, driveably connects the input 28 to carrier 50 through clutch 68, and connects the input 28 to the sun gears 46, 54 through clutch 70. Alternatively the gear unit 32 may be replaced by a first layshaft gear set having a first pinion secured to input 28 and a first gear meshing with the pinion and connected to the first clutch 64 and second clutch 66, and a second layshaft gear set having a second pinion secured to input 28 and a second gear meshing with the second pinion and connected to the third clutch 68 such that the speed ratio of the second layshaft gear set is greater than the speed ratio produced by the first layshaft gear set.

The double planetary gear unit formed by gear units 34, 36 includes four members A, B, C, D. The first member A comprises the ring gear 56 of the gear unit 36 and the member connecting clutch 64 to ring gear 56. The second member B comprises planet carrier 58, output 29, and ring gears 48, 49, which rotate as a unit due to ring gear 49 being secured to carrier 58. The third member C comprises the planet carrier 50 of gear unit 34. The fourth member D comprises sun gears 46 and 54 of the gear units 34 and 36, which are secured mutually for rotation as a unit, and the members that connect clutches 66, 70, 72 to sun gears 46, 54.

An optional one-way, overrunning clutch 80, arranged in parallel with brake 74 between carrier 50 and the transmission case 71, produces a drive connection during reverse torque conditions, i.e., when power is transmitted from the output 29 to the input 28, such as when the vehicle is coasting downhill. When clutch 80 produces a drive connection, carrier 50 is held against rotation without brake 74 being engaged.

Operation of the transmission is described next with reference to the engaged and disengaged state of the friction elements, which states in combination produce each of the gear ratios. Preferably, the states of the clutches and brakes are changed automatically in accordance with execution of a control algorithm by an electronic transmission controller. FIG. 2 is a chart indicating the state of engagement and disengagement of the clutches and brakes corresponding to each the gear ratios. In the chart, symbol "X" identifies an engaged friction clutch and friction brake. A blank indicates that the corresponding clutch and brake is disengaged or released. FIG. 2 shows for each forward and reverse gear the operating state of the clutches and brakes that control the transmission of FIG. 1 and the speed ratio of the respective gear.

The transmission operates in the first forward gear when clutch 64 and brake 74 are engaged, and the other friction elements are disengaged. With sun gear 38 of the first gear unit 32 held against rotation and its carrier 42 directly connected to input 28, the speed of its ring gear 40 is underdriven relative to the speed of input 28. Ring gear 56 driveably connected to ring gear 40 through clutch 64. Brake 74 holds carrier 50 against rotation and produces a torque reaction on the transmission case 71. With carrier 50 held against rotation, sun gears 46, 54 mutually secured to rotate at the same speed, and carrier 58 and ring gear 49 secured mutually for rotation at the same speed, ring gear 48 and output 29 are underdriven due to an additional speed reduction. With the transmission operating in first gear, the ratio of the speed of input 28 and the speed of output 29 is 6.387.

As FIG. 2 shows, the transmission operates in each of the five lowest forward gears when clutch 64 is engaged; therefore, in each of the five lowest gears, ring gear 56 is underdriven relative to the speed of input 28.

An upshift to the second speed ratio results by maintaining clutch 64 engaged, engaging brake 72, and disengaging brake 74. Ring gear 40 is underdriven relative to the speed of input 28 due to a first speed reduction produced in gear unit 32 due to its sun gear 38 being held against rotation. Sun gears 46 and 54 are fixed against rotation due to the engagement of brake 72. Ring gear 56 rotates at the underdriven speed of ring gear 40. Carrier 58 and ring gear 49 are secured mutually to rotate at the same speed. Therefore, the ring gear 49 and output 29 are underdriven relative to the ring gear 56 due to a second speed reduction produced in gear units 34, 36. With the transmission operating in second gear, the ratio of the speed of input 28 and the speed of output 29 is 3.498.

An upshift to third gear from second gear results upon disengaging brake 72, engaging clutch 66, and maintaining clutch 64 engaged. Clutch 66 driveably connects ring gear 40 to sun gears 46, 54. Clutch 64 driveably connects ring gear 40 to ring gear 56. Ring gear 40 is underdriven relative to the speed of the input due to the speed reduction produced in the first gear unit 32 with sun gear 38 held against rotation. Because the speeds of sun gears 46, 54 and ring gear 56 are equal and underdriven relative to the speed of input 28, carrier 58, ring gear 49, ring gear 48 and output 29 are underdriven at that same speed due to the speed reduction produced in gear unit 32. With the transmission operating in third gear, the ratio of the speed of input 28 and the speed of output 29 is 2.250.

An upshift to fourth gear from third gear results upon engaging clutch 70, disengaging clutch 66, and maintaining clutch 64 engaged. Clutch 70 driveably connects carrier 42 and input 28 to sun gears 46, 54. Clutch 64 driveably connects ring gear 40 to ring gear 56. Due to the speed reduction produced in the first gear unit 32 with sun gear 38 held against rotation, ring gears 40 and 56 are underdriven relative to the speed of the input 28. With the transmission operating in fourth gear, the ratio of the speed of input 28 and the speed of output 29 is 1.556.

An upshift to fifth gear from fourth gear results by maintaining clutch 64 engaged, engaging clutch 68, and disengaging clutch 70. Ring gear 56 of the third gear unit 36 is underdriven through clutch 64 relative to the speed of input 28 due to the speed reduction that occurs in gear unit 32. Carrier 50 is driven at the speed of input 28 through clutch 68. Sun gears 46, 54 are secured mutually; therefore, they rotate at the same speed. Similarly carrier 58 and ring gear 49 are secured mutually; therefore, they rotate at the same speed. With the transmission operating in fifth gear, the ratio of the speed of input 28 and the speed of output 29 is 1.243.

An upshift to sixth gear from fifth gear results upon engaging clutch 70, disengaging clutch 64, and maintaining clutch 68 engaged. With the friction elements so disposed, clutch 68 driveably connects input 28 to carrier 50 of the second gear unit 34, and clutch 70 driveably connects input 28 through carrier 42 to sun gear 46 of the second gear unit. The second gear unit 34 is locked-up; therefore, its ring gear 48 and output 29 rotate at the speed of the input 28. With the transmission operating in sixth gear, the ratio of the speed of input 28 and the speed of output 29 is 1.000.

An upshift to seventh gear from sixth gear results upon engaging clutch 66, disengaging clutch 70, and maintaining clutch 68 engaged. Clutch 66 driveably connects the ring gear 40 of the first gear unit 32 to the sun gears 46, 54, and clutch 68 driveably connects input 28 to carrier 50 of the second gear unit 34. A torque reduction and speed increase produced in the second gear unit 34 causes ring gear 48 and output 29 to rotate faster than the speed of input 28. With the transmission operating in seventh gear, the ratio of the speed of input 28 and the speed of output 29 is 0.807.

An upshift to eight gear from seventh gear results upon engaging brake 72, disengaging clutch 66, and maintaining clutch 68 engaged. With the friction control elements so disposed, clutch 68 driveably connected input 28 to carrier 50 of the second gear unit 34, and engagement of brake 72 holds sun gear 46 of the second gear unit 34 against rotation, thereby providing a torque reaction.

The second gear unit 34 produces a torque reduction and speed increase, which overdrives its ring gear 48 and output 29 relative to the speed of input 28. With the transmission operating in eight gear, the ratio of the speed of input 28 and the speed of output 29 is 0.698.

A low-speed reverse gear is produced upon engaging clutch 66 and brake 74 concurrently, and releasing the other friction elements. Ring gear 40, the underdriven output of gear unit 32, underdrives sun gear 46 through clutch 66 in a forward direction. With carrier 50 held against rotation by brake 74, the second gear unit 34 produces a second torque amplification and speed reduction, which further underdrives ring gear 48 and output 29 and reverses the direction of their rotation relative to input 28. With the transmission operating in reverse gear, the ratio of the speed of input 28 and the speed of output 29 is −5.211.

A higher speed reverse gear is produced upon engaging clutch 70 and brake 74, and releasing the other friction elements. Clutch 70 driveably connects carrier 42 of gear unit 32 and the input 28 to sun gear 46 in a forward direction. With carrier 50 held against rotation by brake 74, the second gear unit 34 produces a torque amplification and speed reduction, which underdrives ring gear 48 and output 29 and reverses the direction of their rotation relative to input 28. With the transmission operating in reverse gear, the ratio of the speed of input 28 and the speed of output 29 is −2.316.

Figure 3:
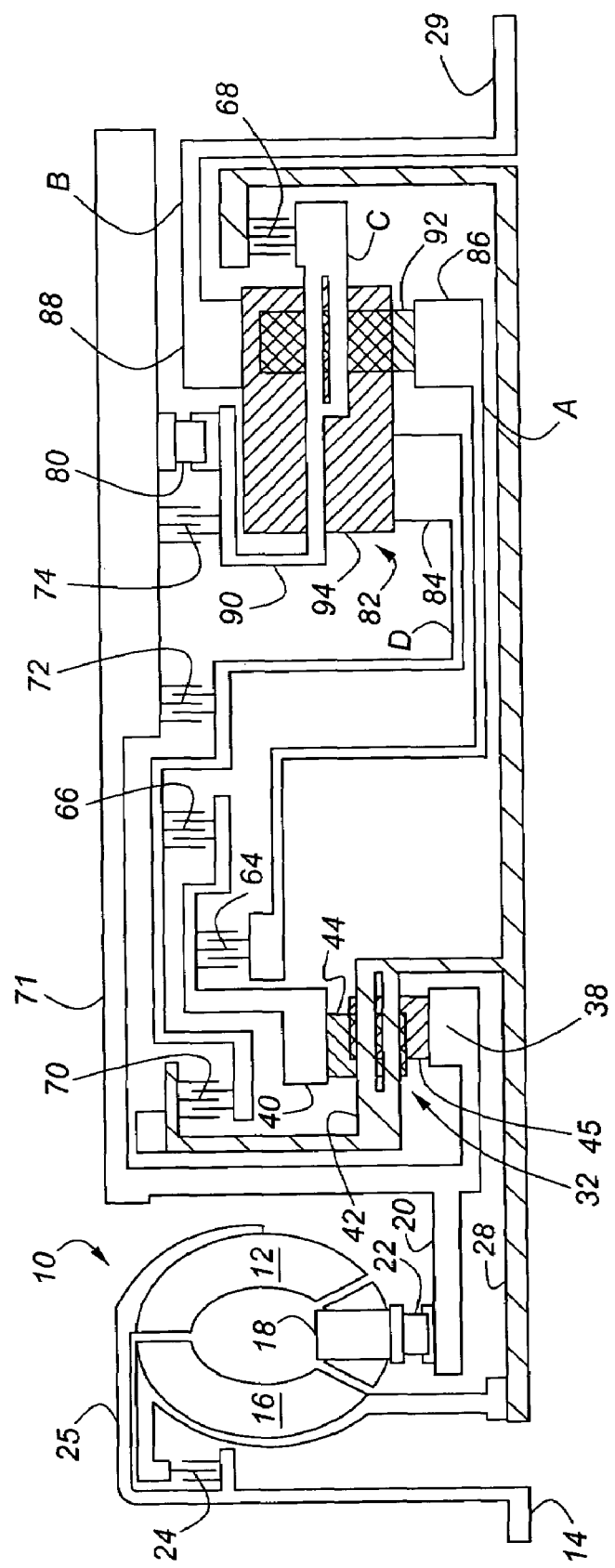
FIG. 3 is a schematic diagram illustrating the kinematic arrangement of a transmission according to the present invention that incorporates a Ravigneaux gear unit.

FIG. 3 illustrates the kinematic arrangement of an automatic transmission according to the present invention, in which a Ravigneaux gear unit 82 replaces the second and third gear units 34, 36 shown in FIG. 1. In FIG. 3, each components that is identical to a component shown in FIG. 1 is referenced with the identical numeral as that used in FIG. 1 for the component.

A gear system includes first and second gear units 32 and 82. The first gear unit 32, is a compound planetary gear unit, includes a sun gear 38, ring gear 40, carrier 42, and two sets of planet pinions 44, 45 supported on carrier 42 in meshing engagement with sun gear 38 and ring gear 40. Pinions 44 are in mesh with ring gear 40; pinions 45 are in mesh with sun gear 38 and pinions 44.

The second gear unit 82 includes axially spaced sun gears 84 and 86; a ring gear 88; carrier 90; and two sets of planet pinions 92 and 94, rotatably supported on carrier 90. Planet pinions 92 are in mesh with sun gear 86; planet pinions 94 are in mesh with sun gear 84, ring gear 88 and planet pinions 92.

Sun gear 38 of the first gear unit 32 is fixed against rotation. Carrier 42 of the first gear unit 32 is driveably connected to the input 28. The ring gear 88 of the second gear unit 82 is driveably connected to the output 29.

Ring gear 40 of the first gear unit 32 is continually driveably connected to clutches 64 and 66. Clutch 64 alternately driveably connects and disconnects ring gear 40 and sun gear 86. Clutch 66 alternately driveably disconnects and connects ring gear 40 to sun gear 84.

Carrier 90 of the second gear unit 82 is alternately driveably connected and disconnected by clutch 68 to the input 28.

Carrier 42 of the first gear unit 32 is alternately driveably disconnected and connected by clutch 70 to sun gear 84.

Sun gear 84 is alternately held against rotation, preferably on transmission case 71, upon engagement of brake 72, and released for free rotation upon disengagement of brake 72.

Engagement of brake 74 holds carrier 90 against rotation on the transmission case 71. Disengagement of brake 74 releases carrier 90 for free, independent rotation. A one-way, overrunning clutch 80, arranged in parallel with brake 74 between carrier 90 and the transmission case 71, produces a drive connection during certain reverse torque conditions, i.e., when power is transmitted from the output 29 to the input 28, such as when the vehicle is coasting downhill. When clutch 80 produces a drive connection, as it does in first gear, carrier 90 is held against rotation without brake 74 being engaged.

Clutches 64, 66, 68, 70 and brakes 72, 74, are preferably hydraulically-actuated friction devices having sets of interleaved friction discs and spacer plates, the discs being secured to one element of the clutch or brake, the spacer plates secured to another element of the clutch or brake. When hydraulic pressure increases in the cylinder of a servo that actuates a respective friction element, the discs and plates of the respective friction element are forced by displacement of the servo piston into mutual frictional contact, thereby producing a drive connection between the components of the gear units to which the elements of the clutch or brake are secured. When the pressure is vented from the servo cylinder, the clutch or brake is disengaged and the components are free to rotate independently. U.S. Pat. No. 4,943,921 describes and illustrates examples of hydraulically actuated friction clutches and brakes, which can be used in the transmission of this invention.

A first power path, whose speed ratio is greater than unity in the embodiment illustrated in FIG. 3, driveably connects ring gear 40 of the first gear unit 32 through clutch 64 to sun gear 86, and connects ring gear 40 through clutch 66 to sun gear 84. A second power path, whose speed ratio is less than the first fixed speed ratio, driveably connects the input 28 to carrier 90 through clutch 68, and connects the input 28 to the sun gear 84 through clutch 70.

The double planetary gear 82 includes four members A, B, C, D. The first member A comprises the sun gear 86 and the member that connects clutch 64 to sun gear 86. The second member B comprises ring gear 88 and output 29, to which the ring gear 88 is secured. The third member C comprises the planet carrier 90 of gear unit 82. The fourth member D comprises sun gear 84 and the members that connects clutch 70, clutch 66, and brake 72 to ring gear 84.

A one-way, overrunning clutch 80, arranged in parallel with brake 74 between carrier 90 and the transmission case 71, produces a drive connection during reverse torque conditions, i.e., when power is transmitted from the output 29 to the input 28, such as when the vehicle is coasting downhill. When clutch 80 produces a drive connection, carrier 90 is held against rotation without brake 74 being engaged.

Operation of the transmission embodiment illustrated in FIG. 3 is described next with reference to the engaged and disengaged state of the friction elements, which states produce each of the gear ratios. The chart of FIG. 4 indicates the state of engagement and disengagement of the clutches and brakes corresponding to each the gear ratios of the transmission embodiment of FIG. 3 and the speed ratio of the respective gear.

The transmission operates in the first forward gear when clutch 64 and brake 74 are engaged, and the other friction elements are disengaged. With sun gear 38 of the first gear unit 32 held against rotation and its carrier 42 directly connected to input 28, the speed of its ring gear 40 is underdriven relative to the speed of input 28. Sun gear 86 is driveably connected to ring gear 40 through clutch 64. Brake 74 holds carrier 90 against rotation. A gear train that includes sun gear 86, planets 92, and planets 94 produces a further speed reduction at ring gear 88 and output 29 relative to the speed of sun gear 86. With the transmission operating in first gear, the ratio of the speed of input 28 and the speed of output 29 is preferably about 6.169.

As FIG. 4 shows, the transmission operates in each of the five lowest forward gears when clutch 64 is engaged; therefore, in each of the five lowest gears, sun gear 86 is underdriven relative to the speed of input 28.

An upshift to the second speed ratio results by maintaining clutch 64 engaged, engaging brake 72, and disengaging brake 74. Ring gear 40 is underdriven relative to the speed of input 28 due to a first speed reduction produced in gear unit 32 due to its sun gear 38 being held against rotation. Sun gear 86 is underdriven at the speed of ring gear 40. Sun gear 84 is fixed against rotation due the engagement of brake 72. Pinions 92 drive pinions 94, which rotate on sun gear 84 and drive the output 29 through ring gear 88 With the transmission operating in second gear, the ratio of the speed of input 28 and the speed of output 29 preferably is about 3.461.

An upshift to third gear from second gear results upon disengaging brake 72, engaging clutch 66, and maintaining clutch 64 engaged. Clutch 66 driveably connects ring gear 40 to sun gear 84. Clutch 64 driveably connects ring gear 40 to ring gear 86. Ring gear 40 is underdriven relative to the speed of the input due to the speed reduction produced in the first gear unit 32 with sun gear 38 held against rotation. Because the speeds of sun gears 84 and 86 are equal to the speed of ring gear 40, ring gear 88 and output 29 are underdriven at that same speed. With the transmission operating in third gear, the ratio of the speed of input 28 and the speed of output 29 is preferably about 2.250.

An upshift to fourth gear gear from third gear results upon engaging clutch 70, disengaging clutch 66, and maintaining clutch 64 engaged. Clutch 70 driveably connects carrier 42 and input 28 to sun gear 84. Clutch 64 driveably connects ring gear 40 to sun gear 86, at the underdriven speed produced in gear unit 32. The output of the double planetary gear unit 82 is taken at ring gear 88 and output 29, which are underdriven relative to the speed of the input 28. With the transmission operating in fourth gear, the ratio of the speed of input 28 and the speed of output 29 is about 1.565.

An upshift to fifth gear from fourth gear results by maintaining clutch 64 engaged, engaging clutch 68, and disengaging clutch 70. Sun gear 86 of gear unit 82 is underdriven through clutch 64 relative to the speed of input 28 due to the speed reduction that occurs in the first gear unit 32. Carrier 90 is driven at the speed of input 28 through clutch 68. Ring gear 88 and output 49 are slightly underdriven relative to the speed of input 28 due to the speed increase produced by gear unit 82. With the transmission operating in fifth gear, the ratio of the speed of input 28 and the speed of output 29 preferably is about 1.254.

An upshift to sixth gear from fifth gear results upon engaging clutch 70, disengaging clutch 64, and maintaining clutch 68 engaged. With the friction elements so disposed, clutch 68 driveably connects input 28 to carrier 90 of the double gear unit 82, and clutch 70 driveably connects input 28 through carrier 42 to sun gear 84 of the double gear unit. Consequently gear unit 82 is locked-up producing a direct drive output. i.e., its ring gear 48 and output 29 rotate at the speed of the input 28. With the transmission operating in sixth gear, the ratio of the speed of input 28 and the speed of output 29 is 1.000.

An upshift to seventh gear from sixth gear results upon engaging clutch 66, disengaging clutch 70, and maintaining clutch 68 engaged. Clutch 66 driveably connects the underdiven ring gear 44 of the first gear unit 32 to the sun gear 84, and clutch 68 driveably connects input 28 to carrier 90 of the double gear unit 82. A torque reduction and speed increase produced in the gear unit 82 causes ring gear 88 and output 29 to rotate faster than the speed of input 28. With the transmission operating in seventh gear, the ratio of the speed of input 28 and the speed of output 29 is preferably about 0.801.

An upshift to eighth gear from seventh gear results upon engaging brake 72, disengaging clutch 66, and maintaining clutch 68 engaged. With the friction control elements so disposed, clutch 68 driveably connected input 28 to carrier 90 of the double gear unit 82. Engagement of brake 72 holds sun gear 84 against rotation, thereby providing a torque reaction. Gear unit 82 produces a torque reduction and speed increase, which overdrives its ring gear 88 and output 29 relative to the speed of input 28. With the transmission operating in eighth gear, the ratio of the speed of input 28 and the speed of output 29 is about 0.691.

A low-speed reverse gear is produced upon engaging clutch 66 and brake 74 concurrently, and releasing the other friction elements. Ring gear 40, the underdriven output of gear unit 32, underdrives sun gear 84 through clutch 66 in a forward direction. With carrier 90 held against rotation by brake 74, gear unit 82 produces a second torque amplification and speed reduction, which further underdrives ring gear 88 and output 29 and reverses the direction of their rotation relative to those of input 28. With the transmission operating in reverse gear, the ratio of the speed of input 28 and the speed of output 29 is about −5.033.

A higher speed reverse gear is produced upon engaging clutch 70 and brake 74, and releasing the other friction elements. Clutch 70 driveably connects the input 28 and carrier 42 to sun gear 84 in a forward direction. With carrier 90 held against rotation by brake 74, the second gear unit 34 produces a torque amplification and speed reduction, which underdrives ring gear 88 and output 29 and reverses the direction of their rotation relative to those of input 28. With the transmission operating in reverse gear, the ratio of the speed of input 28 and the speed of output 29 is about −2.237.

A final drive mechanism and differential mechanism (not shown), driveably connected to output 29, transmit power to the drive wheels of a vehicle, as described and illustrated in U.S. Pat. No. 5,261,862. Preferably, a gear selector lever, controlled by the vehicle operator is used to select the operating ranges of the transmission, by being moved among positions where the various gear ratios are produced automatically and other positions where the gear ratios are produced manually.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A multi-speed automatic transmission comprising:
    an input;
    an output;
    a first power path producing a first ratio of a speed of the input and a speed of a first power path output;
    a second power path producing a second ratio of a speed of the input and a speed of the second power path output, the second ratio being is less than the first ratio;
    a double planetary gear unit secured to first, second, third and fourth members, the second member being secured to the output for rotation therewith, the double planetary gear unit further comprising of a second gear unit including a second sun gear secured to the fourth member, second ring gears, one of said second ring gears being secured to the output and second member, second planet pinions meshing with the second sun gear and the second ring gears, and a second carrier rotatably supporting the second planet pinions and secured to the third member;
    a third gear unit including a third sun gear secured to the second sun gear and the fourth member, a third ring gear, and a third carrier rotatably supporting third planet pinions and secured to the other of the second ring gears;
    a first clutch being operable to connect the first member to the input through the first power path;
    a second clutch being operable to connect the fourth member to the input through the first power path;
    a third clutch being operable to connect the third member to the input through the second power path;
    a fourth clutch being operable to connect the fourth member to the input through the second power path; and
    a first brake being operable to hold the fourth member against rotation; and a second brake being operable to hold the third member against rotation.

2. The transmission of claim 1 further comprising:
    a first gear unit including a sun gear secured against rotation, a ring gear, first planet pinions meshing with the ring gear, second planet pinions meshing with the sun gear and the first planet pinions, and a carrier rotatably supporting the first and second planet pinions and secured to the input, the output of the first power path being secured to the ring gear, an output of the second power path being secured to the carrier.

3. The transmission of claim 1 wherein the double planetary gear unit further comprises:
    a first gear unit including a first sun gear secured to the fourth member, a first ring gear secured to the second member and the output, first planet pinions meshing with the first sun gear and the first ring gear, and a carrier rotatably supporting the first planet pinions thereon and secured to the third member; and
    a second gear unit including a second sun gear secured to the first member, second planet pinions meshing with the second sun gear and first planet pinions and rotatably supported on the carrier.

4. The transmission of claim 1 wherein operation in a forward gear or a reverse gear is produced by concurrent engagement of two of the group consisting of the first clutch, the second clutch, the third clutch, the fourth clutch, the first brake and the second brake.

5. The transmission of claim 1 wherein engagement of the first clutch and the second brake and disengagement of the second clutch, the third clutch, the fourth clutch, and the first brake produce a first forward gear.

6. The transmission of claim 1 wherein engagement of the first clutch and the first brake and disengagement of the second clutch, the third clutch, the fourth clutch, and the second brake produce a second forward gear.

7. The transmission of claim 1 wherein engagement of the first clutch and the second clutch and disengagement of the third clutch, the fourth clutch, the first brake, and the second brake produce a third forward gear.

8. The transmission of claim 1 wherein engagement of the first clutch and the fourth clutch and disengagement of the second clutch, the third clutch, the first brake, and the second brake produce a fourth forward gear.

9. The transmission of claim 1 engagement of the first clutch and the third clutch and disengagement of the second clutch, the fourth clutch, the first brake, and the second brake produce a fifth forward gear.

10. The transmission of claim 1 wherein engagement of the third clutch and fourth clutch and disengagement of the first clutch, the second clutch, the first brake, and the second brake produce a sixth forward gear.

11. The transmission of claim 1 wherein engagement of the second clutch and the third clutch and disengagement of the first clutch, the fourth clutch, the first brake, and the second brake produce a seventh forward gear.

12. The transmission of claim 1 wherein engagement of the first brake and the third clutch and disengagement of the first clutch, the second clutch, the fourth clutch, and the second brake produce an eight forward gear.

13. The transmission of claim 1 wherein engagement of the second clutch and the second brake and disengagement of first clutch, the third clutch, the fourth clutch, and the first brake produce a low speed ratio reverse gear.

14. The transmission of claim 1 wherein engagement of the fourth clutch and the second brake and disengagement of first clutch, the second clutch, the third clutch, and the first brake produce a relatively higher speed ratio reverse gear.

15. The transmission of claim 1 further comprising:
a casing; and
a one-way clutch arranged in parallel with the second brake between the casing and the fourth member.

* * * * *